U. C. GREGGS.
WRENCH.
APPLICATION FILED APR. 12, 1910.
970,371.
Patented Sept. 13, 1910.
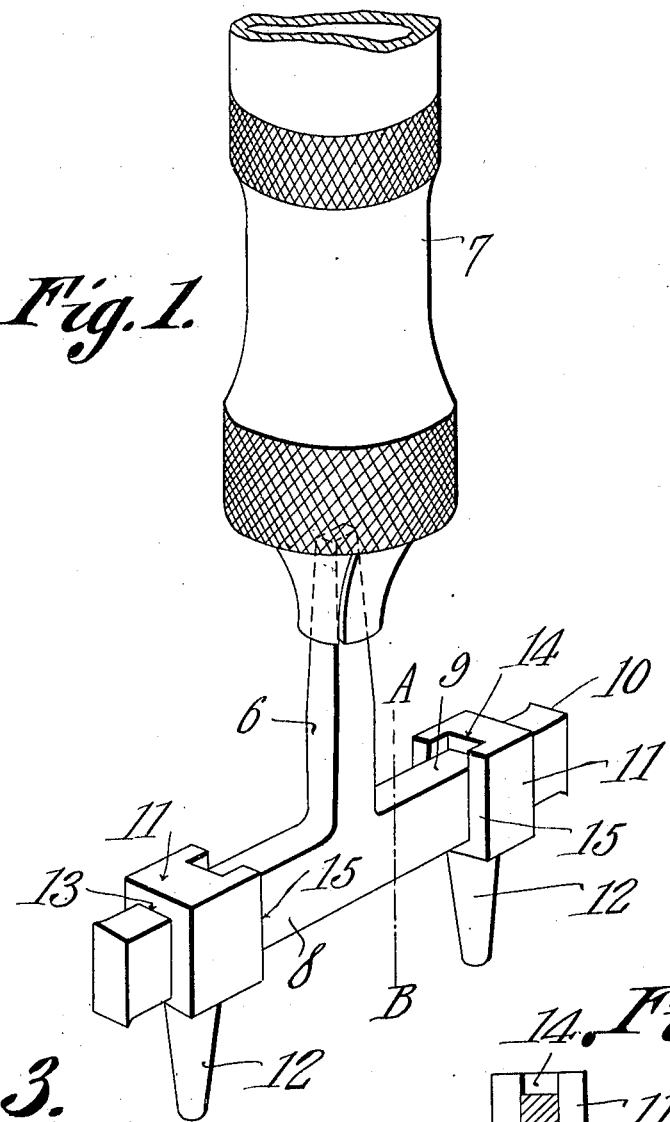
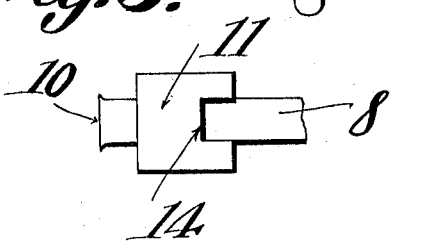
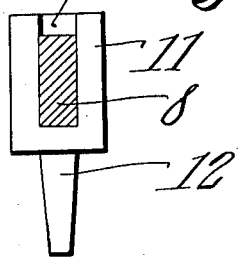
Inventor
Uriah C. Greggs.
By C. A. Snow & Co.
Attorneys
Witnesses
Francis Boyle

UNITED STATES PATENT OFFICE.

URIAH C. GREGGS, OF TERRE HAUTE, INDIANA.

WRENCH.

970,371.  Specification of Letters Patent.  Patented Sept. 13, 1910.

Application filed April 12, 1910.  Serial No. 554,976.

*To all whom it may concern:*

Be it known that I, URIAH C. GREGGS, a citizen of the United States, residing at Terre Haute, in the county of Vigo and State of Indiana, have invented a new and useful Wrench, of which the following is a specification.

This invention relates to spanner wrenches particularly to spanner wrenches designed for use in applying screw nuts to their bolts in billiard tables and similar furniture.

Another object is to provide a simple spanner wrench which will be adjustable to all nuts and may be applied to an ordinary brace for operating.

With the above and other objects in view which will appear as the description proceeds, my invention embraces certain novel detail of construction and combination of parts which will be hereinafter more fully described and claimed.

In the accompanying drawings forming part of this specification, Figure 1 is a perspective view of my improved spanner wrench. Fig. 2 is a transverse sectional view taken on the line A—B Fig. 1. Fig. 3 is a fragmentary plan view of one of the engaging fingers.

Referring now to the drawing in which like character of references designate similar parts in the views shown, it may be seen that the wrench consists of a T shaped bit having its shank 6 tapered at one end so as to be readily engaged between the gripping jaws of a brace 7. The arms 8 and 9 of the bit are formed square in cross section and are provided at their outer end with expanded portions 10 to prevent the escape of the nut engaging fingers.

The nut engaging fingers each comprise an eye 11 adapted to loosely engage an arm of the bit, and a tapered prong 12 which is adapted to be engaged in the orifice of a screw nut such as commonly used in billiard tables and similar furniture where the nut must be countersunk into the wood. Each eye 11 forms a square orifice 13 which conforms to the contour of its supporting arm and prevents the rotation of the fingers upon said arm. Formed in the top face of each eye 11 is an orifice 14 adapted to house the adjacent portion of the bit shank 6 when the finger is slid to its innermost limit of movement. By this construction the opposed end faces 15 of the eyes are in abutting contact when the fingers are at their innermost limit of movement, the object of this being to permit the fingers to engage a smaller screw nut than would be possible were the opposed faces of the fingers arranged to abut the adjacent end face of the shank 6 when in their innermost position.

The engaging fingers, it is evident, may be spread apart or drawn together as the occasion requires to effectively grip the various sized nuts in general use.

From the foregoing description taken in connection with the accompanying drawing, it is thought that the construction and operation of my invention will be easily understood without a more extended explanation, it being understood that various changes may be made in the minor details of construction within the scope of the appended claim.

What is claimed is:

A billiard table wrench consisting of a T shaped bit the shank of which is adapted to engage a brace, and a pair of non-revoluble fingers slidingly fitted on the arms of the T shaped bit, each finger having an orifice on its inner face to receive said shank whereby the opposed faces of the fingers may be held in abutting contact to permit the fingers to engage nuts of less than standard size.

In testimony that I claim the foregoing as my own, I have hereto affixed my signature in the presence of two witnesses.

URIAH C. GREGGS.

Witnesses:
JAMES P. STUNKARD,
HARMON NEWBERGER.